United States Patent
Plutowski (10) Patent No.: US 7,239,962 B2
(45) Date of Patent: Jul. 3, 2007

(54) METHOD AND APPARATUS FOR A ROUTING AGENT

(75) Inventor: Mark Earl Plutowski, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 10/739,543

(22) Filed: Dec. 17, 2003

(65) Prior Publication Data

US 2004/0167712 A1   Aug. 26, 2004

Related U.S. Application Data

(60) Provisional application No. 60/449,503, filed on Feb. 21, 2003.

(51) Int. Cl.
*G01C 21/30* (2006.01)

(52) U.S. Cl. .................. 701/209; 701/208; 701/117; 701/210; 340/995.11; 340/995.14

(58) Field of Classification Search ........ 701/200–202, 701/207–210, 213–214, 23, 117; 340/990–995, 340/995.11, 995.14; 345/119, 123, 473; 342/357.06, 357.13, 357.17; 455/422; 707/2
See application file for complete search history.

(56) References Cited

U.S. PATENT DOCUMENTS

| | | | | |
|---|---|---|---|---|
| 4,608,656 A | * | 8/1986 | Tanaka et al. | 701/212 |
| 5,115,398 A | * | 5/1992 | De Jong | 701/200 |
| 5,161,886 A | * | 11/1992 | De Jong et al. | 701/209 |
| 5,359,529 A | * | 10/1994 | Snider | 701/210 |
| 5,444,965 A | * | 8/1995 | Colens | 56/10.2 A |
| 5,557,522 A | * | 9/1996 | Nakayama et al. | 701/200 |
| 5,613,055 A | * | 3/1997 | Shimoura et al. | 345/473 |
| 5,629,854 A | * | 5/1997 | Schulte | 701/207 |
| 5,845,228 A | * | 12/1998 | Uekawa et al. | 701/209 |
| 5,881,231 A | * | 3/1999 | Takagi et al. | 709/212 |
| 5,890,088 A | * | 3/1999 | Nimura et al. | 701/211 |
| 5,941,934 A | * | 8/1999 | Sato | 701/217 |
| 5,961,571 A | * | 10/1999 | Gorr et al. | 701/207 |

(Continued)

FOREIGN PATENT DOCUMENTS

| | | | |
|---|---|---|---|
| JP | 63-64508 | * | 3/1988 |
| JP | 8-249617 | * | 9/1996 |
| JP | 11-064523 | * | 3/1999 |

(Continued)

OTHER PUBLICATIONS

Zhang et al., Segment-based matching for visual navigation, Computer and Information Science, University of Massachusetts at Amherst, COINS TR91-35, pp. 1-37 (Apr. 1991).*

(Continued)

*Primary Examiner*—Cuong Nguyen
(74) *Attorney, Agent, or Firm*—Blakely, Sokoloff, Taylor & Zafman LLP.

(57) ABSTRACT

A method and apparatus for a route calculation engine is described. The method of calculating a route to a resource comprises identifying a plurality of locations at which the resource may be available and creating an optimal route through the plurality of locations, the route assuring that the resource will be found regardless of availability at any one location.

36 Claims, 8 Drawing Sheets

U.S. PATENT DOCUMENTS

| | | | | |
|---|---|---|---|---|
| 6,003,015 | A | | 12/1999 | Kang et al. |
| 6,028,550 | A | * | 2/2000 | Froeberg et al. ........ 342/357.13 |
| 6,041,281 | A | * | 3/2000 | Nimura et al. .............. 701/211 |
| 6,047,280 | A | * | 4/2000 | Ashby et al. ................... 707/2 |
| 6,121,900 | A | * | 9/2000 | Takishita ............... 340/995.11 |
| 6,128,571 | A | * | 10/2000 | Ito et al. ....................... 701/201 |
| 6,128,574 | A | * | 10/2000 | Diekhans .................... 701/209 |
| 6,148,090 | A | * | 11/2000 | Narioka ....................... 382/113 |
| 6,163,749 | A | * | 12/2000 | McDonough et al. ....... 701/208 |
| 6,178,377 | B1 | * | 1/2001 | Ishihara et al. ............. 701/200 |
| 6,192,314 | B1 | * | 2/2001 | Khavakh et al. ............ 701/209 |
| 6,243,755 | B1 | * | 6/2001 | Takagi et al. ............... 709/229 |
| 6,567,746 | B2 | * | 5/2003 | Kuroda et al. .............. 701/212 |
| 6,611,738 | B2 | * | 8/2003 | Ruffner ........................ 701/23 |
| 6,654,681 | B1 | * | 11/2003 | Kiendl et al. ............... 701/117 |
| 6,662,105 | B1 | * | 12/2003 | Tada et al. ................... 701/209 |
| 6,678,611 | B2 | * | 1/2004 | Khavakh et al. ............ 701/210 |
| 6,678,750 | B2 | * | 1/2004 | Meade et al. ................... 710/7 |
| 6,937,936 | B2 | * | 8/2005 | Nimura ....................... 701/208 |
| 6,950,746 | B2 | * | 9/2005 | Yano et al. .................. 701/210 |
| 6,996,469 | B2 | * | 2/2006 | Lau et al. .................... 701/210 |
| 7,123,620 | B1 | * | 10/2006 | Ma ........................ 370/395.32 |
| 2001/0047241 | A1 | * | 11/2001 | Khavakh et al. ............ 701/209 |
| 2002/0055865 | A1 | | 5/2002 | Hammann |
| 2003/0028319 | A1 | * | 2/2003 | Khavakh et al. ............ 701/209 |
| 2003/0040944 | A1 | * | 2/2003 | Hileman ........................ 705/5 |
| 2004/0167712 | A1 | * | 8/2004 | Plutowski ................... 701/209 |
| 2004/0204846 | A1 | * | 10/2004 | Yano et al. .................. 701/210 |
| 2006/0146820 | A1 | * | 7/2006 | Friedman et al. ........... 370/390 |

FOREIGN PATENT DOCUMENTS

| | | | |
|---|---|---|---|
| JP | 11101871 A | * | 4/1999 |
| JP | 11-230761 | * | 8/1999 |
| JP | 2000-050992 | * | 2/2000 |
| WO | PCT/JP97/03185 | * | 3/1998 |

OTHER PUBLICATIONS

Oh et al., A study of the characteristics of an ommidirectional vision sensor, Advances in Image Processing, SPIE vol. 804, pp. 259-268 (1987).*

Zheng et al., Panoramioc representation for route recognition by a mobile robot, Inter. Journal of Computer Vision, 9:1, pp. 55-76 (1992).*

Hong et al., Image-based navigation using 360 degree views, Proc. of Image Understanding Workshop, pp. 781-791, (1990).*

Unknown, MapQuest releases new mobile MapQuest version 3.0—Brief Article—Product Announcement, from http://www.findarticles.com/, Oct. 2001.*

Alan Cohen, A MapQuest road trip, from http://www.findarticles.com/ Jun. 2003, pp. 1-2.*

Peter J. Gallanis, AAIW awash with innovation, from http://www.findarticles.com/, Nov. 22, 1999.*

Lynn Woods, Getting there via computer—computerized mapping software—Evaluation, Oct. 1998, pp. 1-4.*

Unknown, Mapquest.com delivers wireless driving directions to Palm VII organizer users, from http://www.findarticles.com/, May 31, 1999.*

Unknown, How MapQuest gets you from here to there, from http://www.findarticles.com, Nov. 2003.*

Unknown, Sprint selects MapQuest.com to provide Internet-based driving directions to wireless Web phone users—Company business and marketing, from http://www.findarticles.com, Sep. 13, 1999.*

Unknown, MapQuest(R) Wireless Overview, from http://www.mapquestservices.com/mobile/, copyrighted 2004.*

Monmonier, Computer assisted cartography principles and prospects, published on 1982, pp. 158-185.*

Ahn, John Kwangho, Automatic map name placements system, RPI, Ph.D. Thesis, May 1984, pp. 1-84.*

511 Take TransitSM Trip Planner, http://www.transitinfo.org/tripplanner/help.asp 5 pgs.

Bahar, R.I., et al., "Algebraic Decision Diagrams and their Applications," ICCAD-93: ACM/IEEE International Conference on Computer Aided Design, pp. 188-191, Santa Clara, CA, Nov. 1993.

Bahar, R.I., et al., "An ADD-Based Algorithm for Shortest Path Back-Tracing of Large Graphs," GLSV: Proceedings Great Lakes Symposium on VLSI (GLSV): Design Automation of High Performance VLSI Systems, 1994.

Baier, C., et al., "Model checking continuous-time Markov chains by transient analysis," in Proceedings of CAV '00, Springer-Verlag, 2000.

Bertoli, P., et al., "Heuristic Search + Symbolic Model Checking = Efficient Conformant Planning," Proc. Of IJCAI-2001, 2001.

Blythe, Jim, "An Overview of Planning Under Uncertainty," AI Magazine, 20(2), 1999, pp. 37-54.

Boutilier, C., et al., "Stochastic Dynamic Programming With Factored Representations," Artificial Intelligence, 2000.

Boutilier, R., et al., "Decision-Theoretic, High-level Agent Programming in the Situation Calculus," AAAI-2000, Seventeenth National Conference on Artificial Intelligence, Austin, Texas, Jul. 30-Aug. 2, 2000.

Burch, J.R., et al., "Symbolic Model Checking for Sequential Circuit Verification," Jul. 15, 1993, IEEE Transactions on Computer-Aided Design of Integrated Circuits and Systems, 13(4):401-424; 1994.

Chan, W., et al., "Model Checking Large Software Specifications," Software Engineering Notes, 21(6):156-166, Nov. 1996.

Cimatti, A., et al., "Conformant Planning via Model Checking," in ECP, 1999, pp. 21-34.

Cimatti, A., et al., "Planning via model checking: A decision procedure for {AR}," in ECP, 1997, pp. 130-142

Cleaveland, R., et al., "The Concurrency Workbench: a Semantic Based Tool for the Verification of Concurrent Systems," Sep. 13, 1994, in Proceedings of CAV '00, pp. 36-72.

Draper, D., et al., "Probabilistic Planning with Information Gathering and Contingent Execution," in Proceedings of AIPS94, pp. 31-36, 1994.

Eiter, T., et al., "Planning under incomplete Knowledge," vol. 1861, 2000.

Feng, Z., et al., "Symbolic Heuristic Search for Factored Markov Decision Processes," in Proceedings of the Eighteenth National Conference on Artificial Intelligence (AAAI-02), Edmonton, Alberta, Canada, Jul. 2002.

Feng, Z., et al., "Symbolic LAO* Search for Factored Markov Decision Processes," AIPS 2002 Workshop on Planning via Model Checking, Toulouse, France, Apr. 23, 2002.

Fetch Technologies, http://www.fetch.com/technology.asp, 2 pgs.

Finzi, A., et al., "Open World Planning in the Situation Calculus," in Proceedings of AAAI 2000, 2000.

Giunchiglia, E., et al., "Representing Action: Indeterminacy and Ramifications," Artificial Intelligence, 95(2): 409-438, 1997.

Goldman, Robert P., "Conditional Linear Planning," in K. Hammond, editor, Proceedings of 2nd International Conference on AI Planning Systems, American Association for Artificial Intelligence, pp. 80-85, Menlo Park, California, 1994.

Hansen, E., et al., "LAO*: A heuristic search algorithm that finds solutions with loops," Artificial Intelligence 129, Elsevier Science, pp. 35-62, 2001.

Havelund, K., et al., "Model Checking Java Programs using Java PathFinder," Mar. 12, 1999, International Journal on Software Tools for Technology Transfer, 2(4):366-381, Apr. 2000.

Hoey, J., et al., "Optimal and Approximate Stochastic Planning using Decision Diagrams," Technical Report No. TR-00-05, Department of Computer Science, University of British Columbia, Vancouver, BC, Canada, Jun. 10, 2000.

Hoey, J., et al., "SPUDD: Stochastic Planning using Decision Diagrams," In Fifteenth Conference on Uncertainty in Artificial Intelligence (UAI99), 1999.

Holzmann, G.J., et al., "The Model Checker SPIN," IEEE Trans. Software Eng., vol. 23, pp. 279-295, May 1997.

ISI's Intelligent Travel Agent Program, "Virtual Travel Agent" program lead by Steve Minton, http://www.hpcwire.com/dsstar/00/0404/101441.html. 2 pgs.

Kushmerick, N., et al., "An Algorithm for Probabilistic Planning," In Proceedings of AAAI-94, 1994.

Leone, N., et al., "The DLV System for Knowledge Representation and Reasoning," Technical Report INFSYS RR-1843-02-14, Technical University, Wien, Oct. 2002.

Nau, D., et al., "SHOP: Simple Hierarchical Ordered Planner," In Proceedings of the International Joint Conference on Artificial Intelligence (IJCAI99), ed., T. Dean, Stockholm, Sweden, Morgan Kaufmann Publishers, San Francisco, 1999, pp. 968-973.

Nau, D., et al., "Total-Order Planning with Partially Ordered Subtasks," in Proceedings of IJCAI01, 2001.

Penberthy, J.S., et al., "UCPOP: A Sound, Complete, Partial Order Planner for ADL," in Nebel, B., et al, editors, KR'92, Principles of Knowledge Representation and Reasoning: Proceedings of the Third International Conference, San Mateo, California, Morgan Kaufmann, pp. 103-114.

Pendrith, Mark D., "Distributed Reinforcement Learning for a Traffic Engineering Application," DaimlerChrysler Research & Technology Center, pp. 404-411.

Peot, M., et al., "Conditional Nonlinear Planning," in James Hendler, de., Proceedings of the First International Conference on AI Planning Systems, College Park, Maryland, Jun. 15-17, 1992.

Pryor, L., et al., "Planning for Contingencies: A Decision-based Approach," JAIR, 4:287-339, 1996.

Rintanen, J., "Constructing Conditional Plans by a Theorem-Prover," Journal of Artificial Intelligence Research, 10:323-352, 1999.

Smith, D.E., et al., "Conformant Graphplan," in Proceedings of the 15th National Conference on Artificial Intelligence, AAAI-98, 1998.

St-Aubin, R., et al., "APRICODD: Approximate Policy Construction Using Decision Diagrams," Proceedings of the conference on Neural Information Processing Systems (NIPS), pp. 1089-1095, 2000.

Wang, X.F., et al., "Anytime Algorithm for Agent-mediated Merchant Information Gathering," Agents 2000 Conference.

Weld, D., et al., "Extending Graphplan to Handle Uncertainty & Sensing Actions," in Proceedings of AAAI-98, 1998.

Weld, Daniel S., "Recent Advances in AI Planning," AI Magazine, 1999, Oct. 8, 1998.

* cited by examiner

Policy Diagram
Fig. 4B

Reward Diagram
Fig. 4A

Policy Diagram
Fig. 5B

Reward Diagram
Fig. 5A

Fig. 6

METHOD AND APPARATUS FOR A ROUTING AGENT

RELATED APPLICATIONS

The present invention claims priority to U.S. Provisional Application Ser. No. 60/449,503, filed Feb. 21, 2003, and incorporates that application in its entirety.

FIELD OF THE INVENTION

The present invention relates to point-to-point routing, and more particularly to routing using decision-theoretic model checking.

BACKGROUND

Prior art planning operations generally provide point-to-point routing through a deterministic set of points. The prior art plans assume that the desired resource is available at each point. Furthermore, the prior art planning operations assume that a user can follow the plan. The plans generally do not account for a user missing a turn-off, traffic jams, closed roads, detours, or the user failing to follow a plan. These services do not provide contingency planning for handling such failures in the route.

GPS mapping devices use similar techniques. These services provide a solution for handing failures that arise when the user executes the route. For example, they may detect the failure in real-time and recomputed the route reactively—i.e. in reaction to the failure. The problem with this type of reactive recalculation is that it is time consuming. This can cause delays as the user waits for the new route, which is a major inconvenience if the user is moving at a high velocity along a busy highway. The delays can also cause other types of plan failure due to the time required for recomputation causing the user to miss a turn that would have quickly corrected for the previous failure.

SUMMARY OF THE INVENTION

A method and apparatus for a route calculation engine is described. The method of calculating a route to a resource comprises identifying a plurality of locations at which the resource may be available and creating an optimal route through the plurality of locations, the route assuring that the resource will be found regardless of availability at any one location.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for generating an optimal route for locating a resource is described. The proliferation of and increase in complexity of devices, software and systems and their possible interconnections give a lot of flexibility to customers, but also increases the complexity of operation. The route planning engine of the present invention lets the user have flexibility without the associated complexity because the planner figures out how to do the complex actions which provide the flexibility and personalization. This is useful in old technologies—devices and software that are getting more complex and flexible, as well as in the new opportunities in the semantic web. The semantic web provides a lot of flexibility to customize services to the user, however, the composition of services has to be specified somehow. Planning enables the composition to be done dynamically.

Overview of System Purpose

Planning automatically assembles simple functionalities into complex behaviors, resulting in products that provide more value to the customer. Utility-based personalized planning is feasible in practical applications. In one embodiment, the system includes Anytime Conditional HTN Planning (AC-HTN) for high-level plans and Markov Decision Process (MDP) based Stochastic Planner for reactive problem-solving.

The route is generated while optimizing performance over several criteria. The present invention takes into account the utility and probabilities associated with various steps. Utilities provide a qualitative measure of the value of a desired resource. Utilities depend on the costs and benefits associated with the particular resource at a given location. Probabilities measure the likelihood that a desired resource will be available at a given location.

The present application will be described with respect to planning for finding a restaurant or parking lot. One of skill in the art understands that the same technique may be used to find any other resource, whether at a physical location or in cyberspace. For example, for locating a parking lot, the criteria may include: driving time, parking fee, walking distance to actual destination, traffic conditions, weather, and time pressure. The utility of a parking spot is a function of the parking fee, the distance between the parking spot and the final destination, and the driving distance between the parking spot and the current location.

The expected utility may further balance the trade-offs between cost of travel and expected reward (e.g. a lower price for the resource at a location that is further away.) Other factors may also be incorporated, such as the desirability of parking indoors on a rainy day. Similar considerations can be used for other applications such as located a restaurant on short notice. Furthermore, the cost savings of locating a cluster of locations that may be located somewhat further away but which provide a much higher probability of having the expected resource is included in the calculations in accordance with the present invention.

Basic Description of the System

The present invention uses stochastic planning taking into account utilities and probabilities to maximize expected utility over a multi-step plan. In one embodiment, the algorithms are based upon decision-theoretic regression using symbolic model checking to solve Markov Decision Processes (MDPs). The algorithms, in one embodiment, are customized for the target application to achieve greater speed, and enable the system to perform the present calculations in a time efficient manner.

Figure 1A:
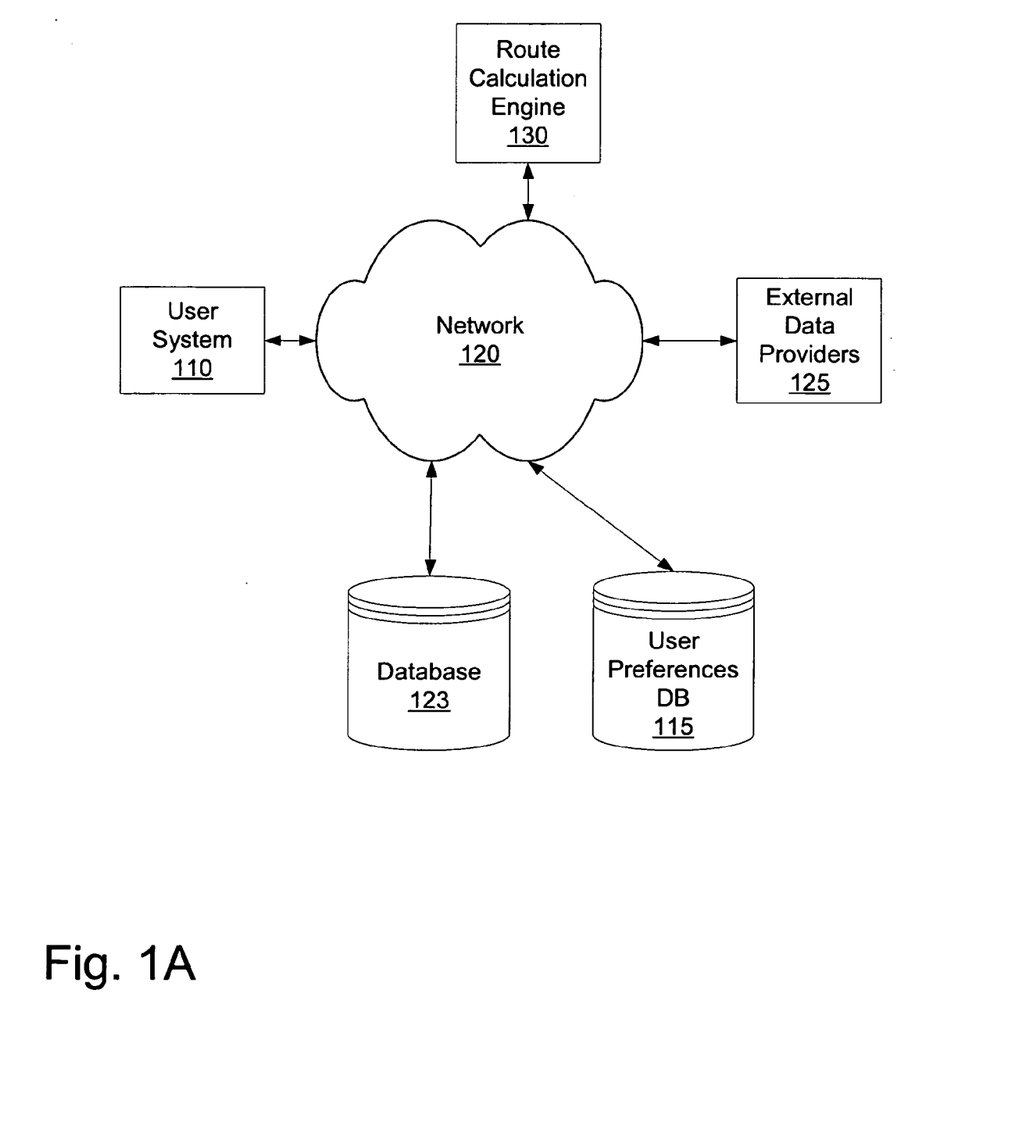
FIG. 1A is a block diagram of one embodiment of a network on which the routing agent may be used.

FIG. 1A is a block diagram of one embodiment of a network on which the routing agent may be used. The user system 110 may be a computer system, an in-car navigation system, a cellular telephone, a palm top, a special purpose appliance, a GPS system, or any other system capable of displaying a route to a user. In one embodiment, the user system 110 may be a computer system with a printer connection, so that a route may be printed, either as an image or as text, as is known in the art.

The user system 110 is coupled via network 120 to route calculation engine 130. The connection between user system 110 and the network 120 may be via any method, including direct connection, DSL, wireless, Bluetooth, the telephone network, or any other method of connectivity.

Route calculation engine 130 may reside on a computer system, such as a server. In one embodiment, the route calculation engine 130 may be on the same computer system as the user system 110. In another embodiment, the route calculation engine 130 may be on a remote system, accessible through a public network, such as the Internet.

The route calculation engine 130 is used to calculate an optimal route, in accordance with the present invention. This route is then sent to the user system 110, for display to the user. The route calculation engine 130, in one embodiment, accesses external data providers 125 to obtain data. For example, external data providers may be used to provide public information.

One exemplary use of the route calculation engine is as a "parking agent." In that instance, the route calculation engine 130 obtains, for parking lots, their locations, hours and rates, and obtains point-to-point driving/walking directions. In one embodiment, the route calculation engine 130 may use external data providers 125 to obtain this data. In one embodiment, the route calculation engine 130 may further obtain weather forecast from web service 125 (to predict rain or heat). The weather forecast may be used to weight the relative value of a shorter walking distance from the parking lot to the final destination.

In one embodiment, primarily static factors, such as locations, hours, and directions to parking lots are stored in database 123. These types of factors, in one embodiment, are frequently used by route calculation engine 130. Therefore, they are stored in a database 123. In one embodiment, the database 123 is local to route calculation engine 130, alternatively, the database 123 may be a remote database, or a distributed database.

Additional factors, such as user preferences, may further be used in the calculations. In one embodiment, user preference database 115 may be used to store particular users' preferences. In another embodiment, user preference data may be received from the user system 110, and may not be stored by the route calculation engine 130.

Figure 1B:
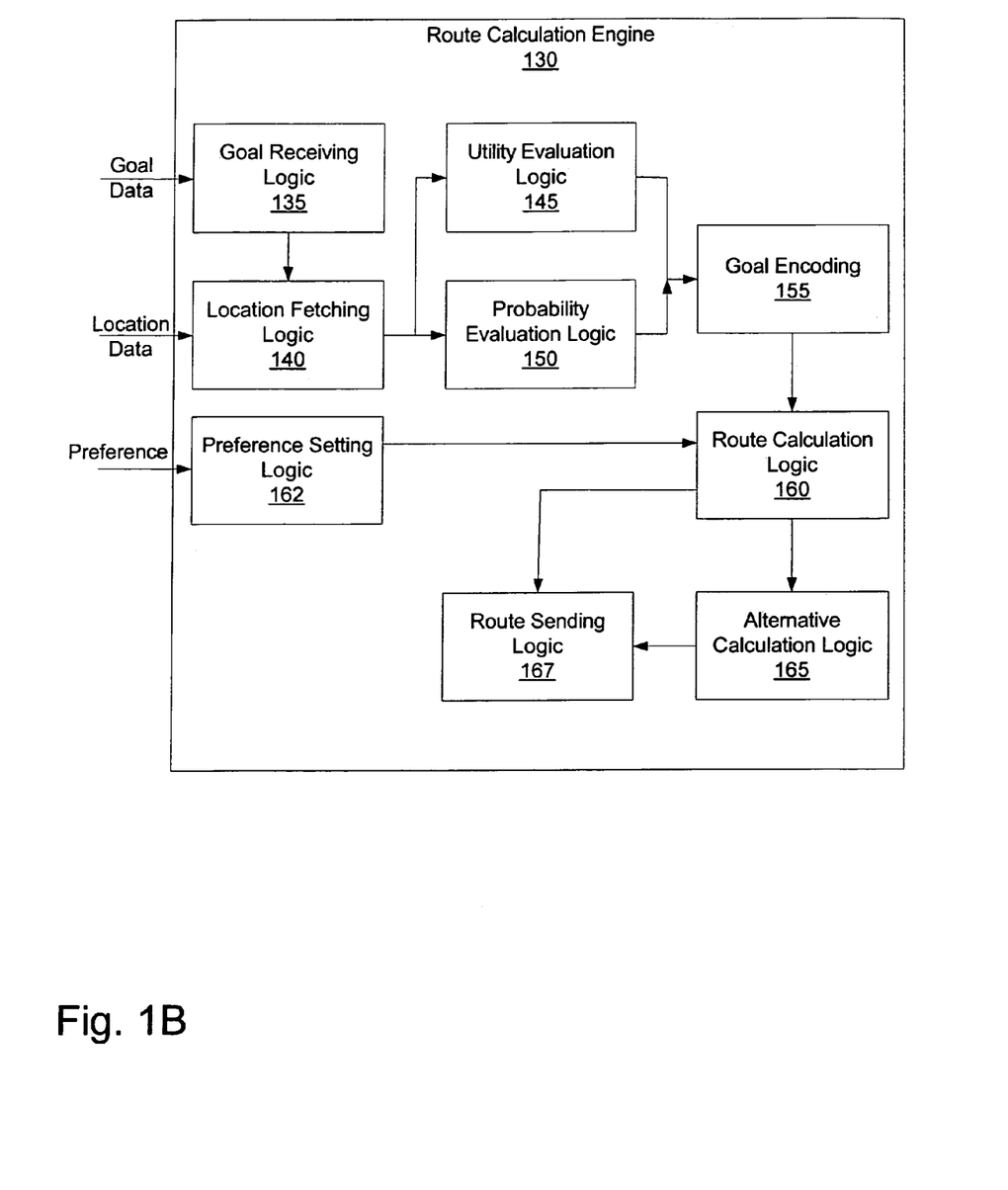
FIG. 1B is a block diagram of one embodiment of a route calculation engine in accordance with the present invention.

FIG. 1B is a block diagram of one embodiment of a route calculation engine in accordance with the present invention. The route calculation engine 130 includes a goal receiving logic 135. The goal receiving logic 135 receives an indicated goal from the user. For example, the goal may be to find a parking lot near a certain restaurant. In one embodiment, the user may enter a goal without explaining the sub-goals. For example, the ultimate goal may be having dinner at a restaurant. The goal receiving logic 135 may then, with the additional data of transportation used and starting location, calculate the route to the best parking lot available near the restaurant.

Location fetching logic 140 fetches the location(s) at which the goal may be available. In one embodiment, the location(s) may be fetched from a database. Alternatively, a web service may be used to fetch the location(s).

Utility evaluation logic 145 evaluates the utility of each location. Utilities provide a qualitative measure of the value of a desired resource. Utilities depend on the costs and benefits associated with the particular resource at a given location. Utility evaluation logic 145 further considers the user's particular preferences. For example, for some users, the utility of a closer parking location is offset by the lowered cost of a parking location further away. These user preferences are incorporated into the calculation of utility by utility evaluation logic 145.

Probability evaluation logic 150 evaluates the probability that the sought resource is available at each of the possible locations. In one embodiment, the system uses statistical analysis to determine whether a resource is available at a particular location. In one embodiment, feedback from users may also be used to update this probability. Thus, for example, if a user sent to a particular parking lot at a particular time indicates that the resource is not available, this information may be used to calculate the probability for other users.

Goal encoding logic 155 encodes the set of known physical locations, with known path costs, rewards, action costs, and availabilities. Based on this data, the route calculation logic 160 creates optimal tour to visit locations in turn until the goal is attained. In one embodiment, preference setting logic 162 provides multi-level reasoning, which enables the system to be set along the continuum between optimization and speed. This provides speed when a valid plan is needed quickly, and enables the route calculation logic 160 to improve the plan as time permits. The preference setting logic 162 enables the system to be set to provide an optimal plan, when wasting time or money is not an option. In one embodiment, the preference setting logic 162 may receive preferences from a user. In another embodiment, the preferences may be set globally.

The alternate route calculation logic 165 calculates alternate route(s) in case the user fails to properly follow directions, or if an unexpected event occurs. For example, there may be a traffic jam or detour that the route calculation logic 165 did not have data about. The alternate route calculation logic 165 calculates alternative routes to the same locations, in case the user indicates that the originally planned route cannot be, or has not been, followed.

This enables the route calculation engine 130 to handle multi-step look-ahead, calculating alternative routes if the resource is not available at the first location. The present system provides multi-step routing for GPS-enabled devices, to generate conditional routes across physically located resources. By comparison: current mapping systems only create deterministic routes (must visit all locations specified), cannot handle utilities (e.g., payoff for visiting a location), and cannot anticipate common failure modes: a "broken" route must be recalculated at run-time. This is time consuming and may be impossible if the user is running the user portion of the routing engine on a device with low computing power.

The calculated route, including the alternatives, are then passed to the user system, for display to the user. In one embodiment, the route is displayed interactive, such that the user is actively following the directions provided.

Figure 1C:
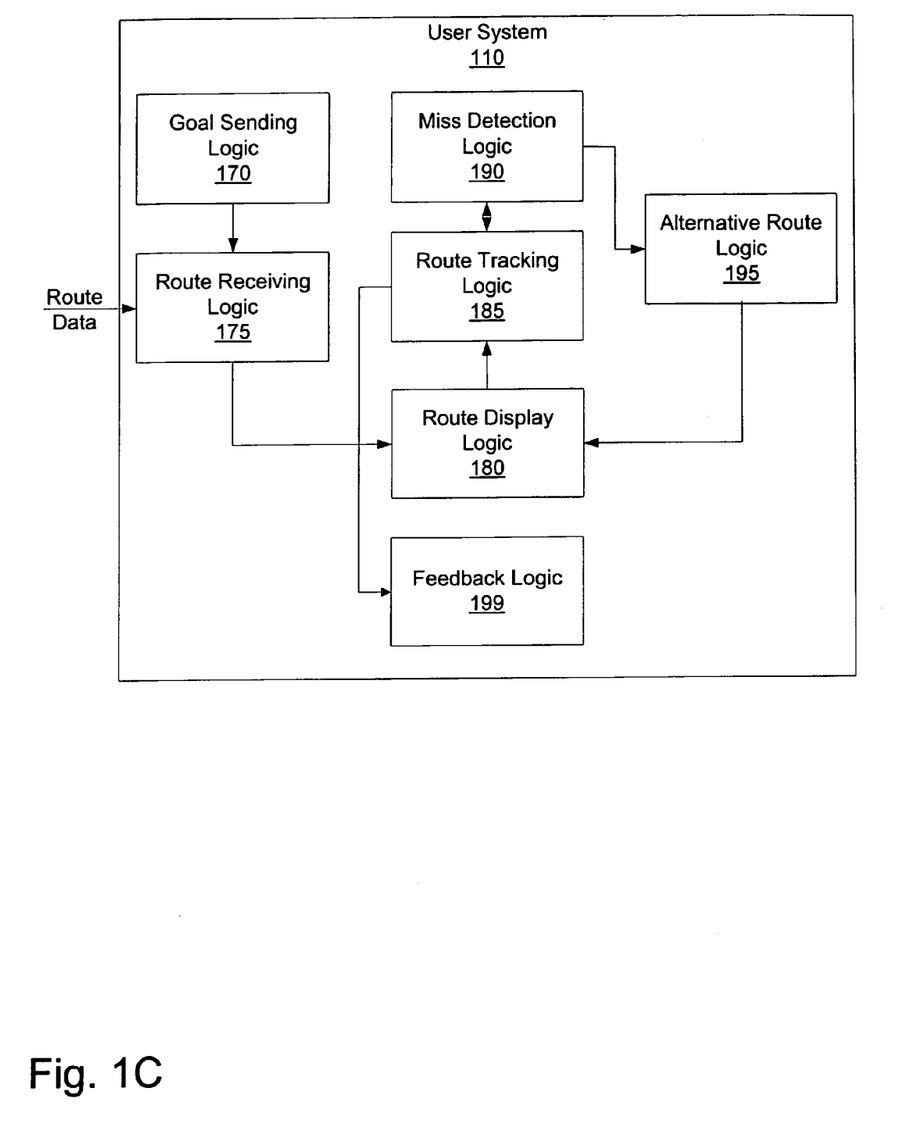
FIG. 1C is a block diagram of one embodiment of a user system for the route calculation engine in accordance with the present invention.

FIG. 1C is a block diagram of one embodiment of a user system for the route calculation engine in accordance with the present invention. The user system 110 is an interactive system, which permits the user to actively follow the route. Goal sending logic 170 enables the user to send a goal to the route calculation logic. In another embodiment, the goal sending logic 170 may be separate from the user system, or may be a common tool. For example, the user may log into a Web page to identify the goal, using a common tool of a Web browser.

Route receiving logic 175 receives route data, including the alternate routes, from the route calculation logic. In one embodiment, route receiving logic 175 is a wireless connection.

Route display logic 180 displays the route to the user. In one embodiment, the route display logic 180 displays only the current route segment. In one embodiment, the route display logic 180 indicates the next segment of the route through verbal instructions. Alternative methods of indicating the route may be used.

Route tracking logic 185, in one embodiment, uses a global positioning system (GPS) to track the user's current location. In another embodiment, the route tracking logic 185 is not part of the user system 110.

The miss detection logic 190 determines whether the user is following the indicated route. In one embodiment, GPS data from the route tracking logic 185 is used. In another embodiment, the user may indicate that he or she is not following the route.

Alternative route logic 195 is used to determine an alternative route (pre-calculated by the route calculating engine), as a result of the user's failure to follow the original route.

Feedback logic 199 may be used by the user, or may be automatically triggered by miss detection logic 190, or route tracking logic 185. The feedback logic 199 is used to receive information about (1) relevant factors that may prevent other users from following a standard route, (2) availability of the resource at each location within the tour that is visited by the user, and (3) any other relevant data. The feedback logic 199 sends information back to the route calculation engine. In one embodiment, if the user system 110 is a small system, the feedback logic 199 may simply store the feedback information, and return the information to the route calculation engine the next time the user connects to the route calculation engine for other purposes. In this way, the feedback process does not incur additional connection charges. In one embodiment, the user may set a preference as to whether, and at what time, feedback data is returned to the route calculation engine.

Figure 2:
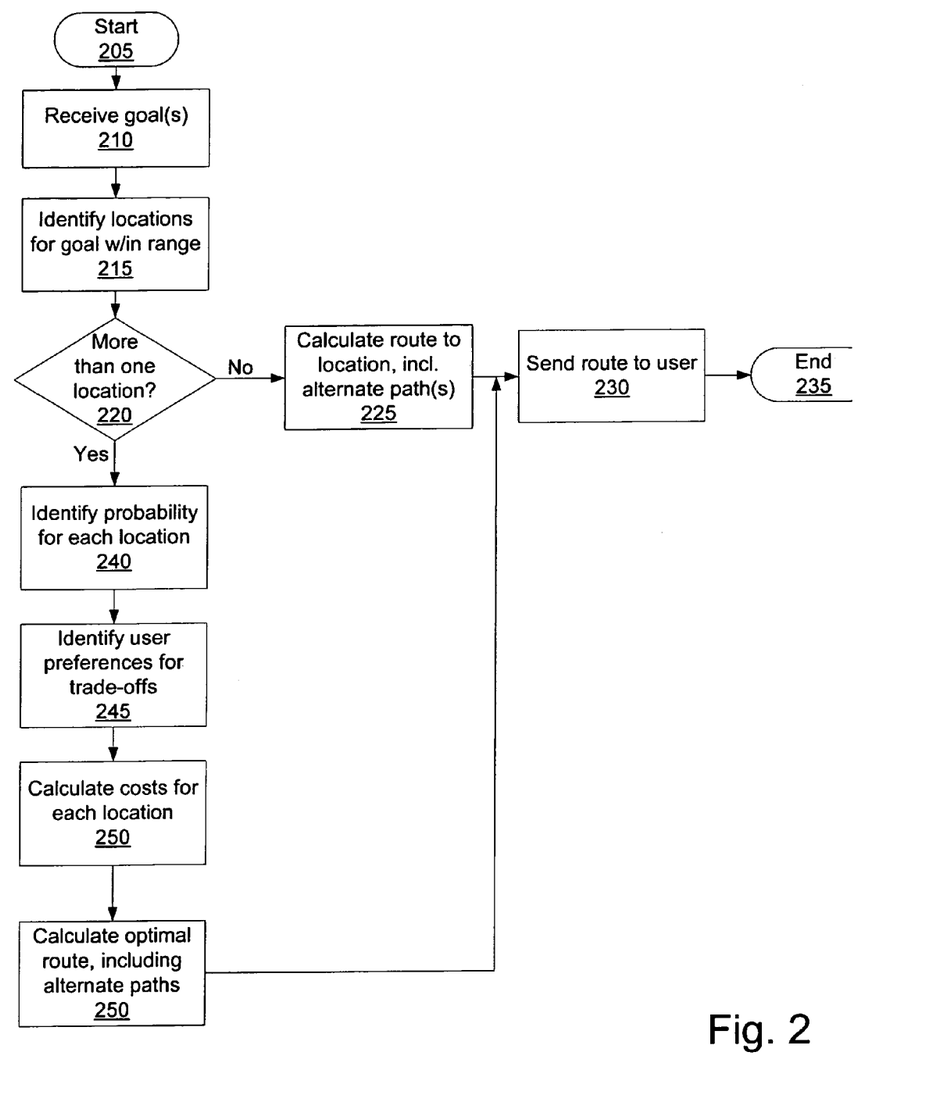
FIG. 2 is an overview flow diagram of one embodiment of generating a route.

FIG. 2 is an overview flow diagram of one embodiment of generating a route. The process starts at block 205. At block 210, a goal is received. The goal, in one embodiment, is received from a user's system. In one embodiment, the goal may be to "park near restaurant X" or a similar goal. In one embodiment, the goal is converted into a "park near address X" by looking up the address for restaurant X.

At block 215, locations at which the goal is available within range are identified. In the example above, the system retrieves the locations of available parking lots near address X, within a certain range. In one embodiment, the user may set the range. For example, the range may be 1 mile, since the user may prefer not to walk more than one mile from the parking lot to the restaurant.

At block 220, the process determines whether there is more than one location available within range. If there is not more than one location available, the process continues to block 225. If there are more locations, the process continues to block 240. In one embodiment, if no locations are available at all, the user is queried whether locations outside the range are acceptable. In one embodiment, if no locations are available, the process fails, and the user is prompted to change at least one of the constraints (location, range, etc.)

At block 225, a route is calculated to the location. In one embodiment, alternate paths are also calculated. Alternate paths allow the user to recover, if he or she fails to follow the directions, miss a turn, or if there is an unexpected problem, such as a traffic jam, detour, etc. Alternate paths, in one embodiment, provide path segments that permit the user to recover to the original path.

At block 230, the route is sent to the user. In one embodiment, the route is sent via a public network such as the Internet. In one embodiment, the route may be sent encrypted or otherwise protected. The process then ends at block 235.

If, at block 220, more than one location was found, the process continued to block 240. At block 240, the probability of the availability of the resource at each location is calculated. In one embodiment, the probability of the availability of the resource varies by time of day, day of week, week of year. In another embodiment, the probability may be obtained from the resource directly. For example, a parking lot may post its current level of occupancy on its web site.

At block 245, the user preferences for trade-offs are identified. The user may set his or her preferences for trade-offs between costs. For example, the user may prefer to pay more, and park closer, or vice versa. In one embodiment, the user's preferences may be affected by factors such as weather, traffic, etc. In one embodiment, the present system obtains such relevant information. Thus, the route calculation engine has a flexible objective function. The user may weight the different objectives. In one embodiment, for locating a parking spot, the objectives may be: save money, save walking time, and save driving time.

At block 250, the process calculates the costs for each location. The costs, for a parking agent, include the driving distance, cost of parking, and walking distance from the lot to the end destination. In one embodiment, the driving distance cost may be calculated in terms of driving time, rather than miles. This enables the system to adjust the cost for traffic level and traffic patterns. Similarly, the cost of walking may be affected by the local weather.

At block 255, the optimal route is calculated, including alternate paths. The optimal route takes into consideration the availability of the resource, the costs, the cost trade-offs preferred by the user, the local conditions, and any other available information. In one embodiment, the route is calculated using a particular "structured" methodology for solving the underlying Markov Decision Process (MDP) known as SPUDD. This method is described in more detail below. Other MDP solvers could be used. In another embodiment, the route is calculated using classical (i.e., "flat" or "non-structured") value iteration. In another embodiment, the route is calculated using policy iteration. In another embodiment, the route is calculated by using linear programming. In another embodiment, the route is calculated by using an "online" method for solving the underlying Markov Decision Process (MDP), such as real-time dynamic programming (RTDP).

The process then, at block 230, sends the route to the user, and ends at block 235.

Figure 3:
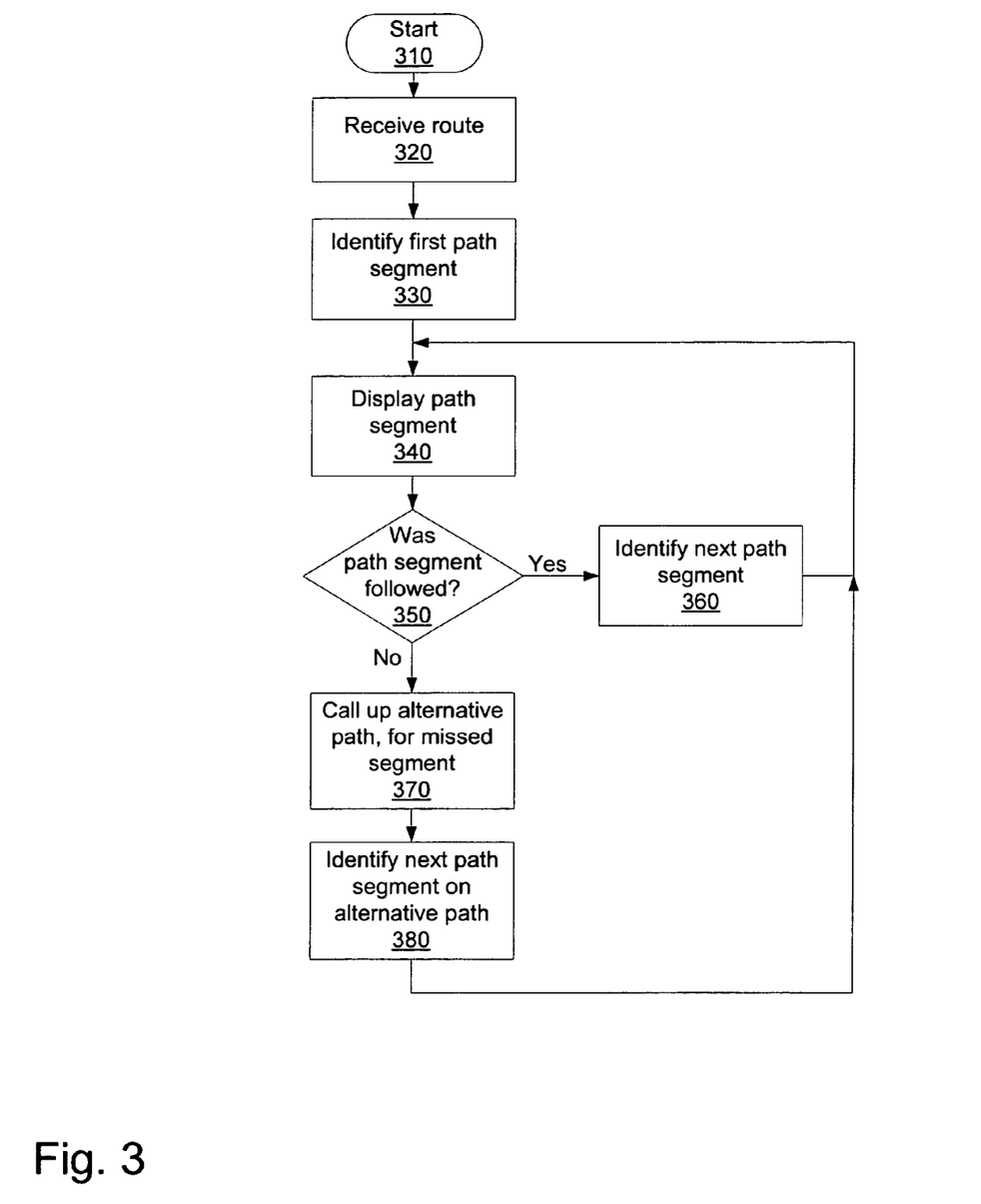
FIG. 3 is a flow diagram of one embodiment of on-the-fly re-routing based on in-path data.

FIG. 3 is a flow diagram of one embodiment of on-the-fly re-routing based on in-path data. In one embodiment, this can be utilized in a GPS-based system, in which the current location is tracked via GPS. In another embodiment, this may be used in another type of system, which permits the user to indicate whether he or she is correctly following the current path, needs the next path segment, or needs to recover from failing to follow the path segment.

The process starts at block 310. In one embodiment, the process starts after a user has sent a goal to the route calculation engine.

At block 320, the route is received from the route calculation engine. In one embodiment, the user system, which receives the route, is an in-car system, or similarly portable system, which is utilized by the user during the actual traveling.

At block 330, the first path segment is identified. In one embodiment, the system identifies the user's current location to display the first path segment. In another embodiment, the user identifies the user's current location to display the first path segment.

At block 340, the path segment is displayed. In one embodiment, the display may be visual, auditory, tactile, or a combination.

At block 350, the process determines whether the path segment was followed. In one embodiment, if the system includes GPS or similar positioning system, the process automatically determines whether the user is in the correct location, based on the path. In another embodiment, the user indicates whether or not he or she followed the path.

If the path was followed, the process continues to block 360, to identify the next path segment. The process then returns to block 340, to display the identified path segment.

If the path was not followed, the process continues to block 370. At block 370, the alternative path for the missed segment is obtained. In one embodiment, the alternative route calculation described above calculates recovery paths for each missed path segment.

At block 380, the next path segment on the alternative/recovery path is identified. The process then returns to block 340 to display the path segment on the alternative path.

In this way, the user is able to easily follow a path, and recover if deviation is necessary.

Planning is becoming more important because devices, systems, and interconnections between these and web services are becoming more complex. Providing such augmented capabilities means that systems can achieve more complex user goals. The system further enables the customization of behavior—each customer gets a unique personalized experience. The problem is that it is hard for customers to specify behaviors, it is hard to predict the behaviors customers want, and the more complex systems get to enable personalization the less user-friendly they are. The present system solves this problem, in one embodiment, by automatically tailoring behaviors to individual customer goals and preferences, resulting in a better experience.

Mathematical Basis for the System

In one embodiment, the route calculation engine uses the MDP solver known as Stochastic Planning using Decision Diagrams (SPUDD). The below mathematical explanation uses SPUDD. It is, however, to be understood that alternative mathematical implementations may be used.

SPUDD is an MDP (Markov Decision Process) solver that performs value iteration. It is a form of decision-theoretic regression that exploits the structure of the problem space, and is therefore referred to as a "structured" form of value iteration. SPUDD creates a policy that can be applied to any initial situation. In one embodiment, SPUDD uses algebraic decision diagrams to represent the MDP instead of conventional decision trees. In another embodiment, conventional decision trees are used. In another embodiment, conventional lookup tables are used. In another embodiment, compression schemes are used to minimize the space required to represent sparse arrays.

In another embodiment, classical (non-structured) value iteration is used. In another embodiment, another algorithm for solving the underlying MDP known as policy iteration is used. In another embodiment, a variant of policy iteration known as Modified Policy Iteration (MPI) is used. In another embodiment, an online form of MDP solver such as real-time dynamic programming (RTDP) is used. In another embodiment, an MDP solver that utilizes a heuristic search such as LAO* is used.

In one embodiment, in order to define a problem, the following elements are used:
1. A set of variables, multi-valued or binary;
2. A set of actions that have some effects on the variables;
3. A set of conditional probability tables (CPTs) for each action for each variable, which give the probability that, given an assignment to the variables, performing the given action will result in the given variable being true;
4. A 0-stage-to-go reward function that maps assignments to variables to real numbers;
5. A discounting factor which provides for discounting future rewards; and
6. A set of action costs; and
7. A tolerance factor specifying a stopping rule that determines when to stop the iterations, to choose between speed and optimization.

One embodiment of the algorithm is as follows:
1. Set $V^0 = R$ where R is the immediate reward diagram; set i=0
2. Create dual action diagrams, $Q_{X'_i}^\alpha (X'_i, X_1, \ldots X_n)$ for each $\alpha \in A$, and for each $X'_i \in X'$
3. Repeat until $temp = temp * Q_{X'_j}^a$ Set temp = Sum the sub-diagrams of temp over the primed variable $X'_j$ (a) Swap all variables in X' with primed versions to create $X''$
   (b) For all $a \in A$
   Set temp = $V^{'i}$ For all primed variables, $X'_i$ in $V^{'i}$ $temp = temp * Q_{X'_j}^a$ Set temp = Sum the sub-diagrams of temp over the primed variable $X'_j$ End For
   Multiply the result by discounting factor $\beta$ -continued and add R to obtain $V_a^i$ End for (c) Maximize over all $V_a^i$'s to create $V^{i+1}$.

(d) Increment i

End Repeat

4. Perform one more iteration and assign to each terminal node the actions a which contributed the value in the value ADD at that node; this yields the $\epsilon$-optimal policy ADD, $\pi^*$. Note that terminal nodes which have the same values for multiple actions are assigned all possible actions in $\pi^*$.

5. Return the value diagram $V^{i+1}$ and the optimal policy $\pi^*$.

Figure 4A:
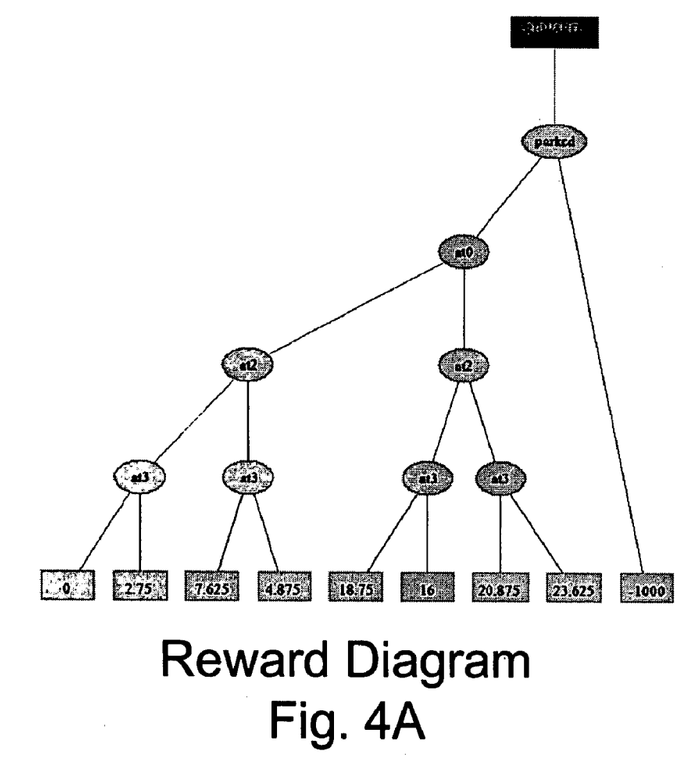
FIGS. 4A and 4B are a simplified reward diagram and a policy diagram.
Figure 4B:
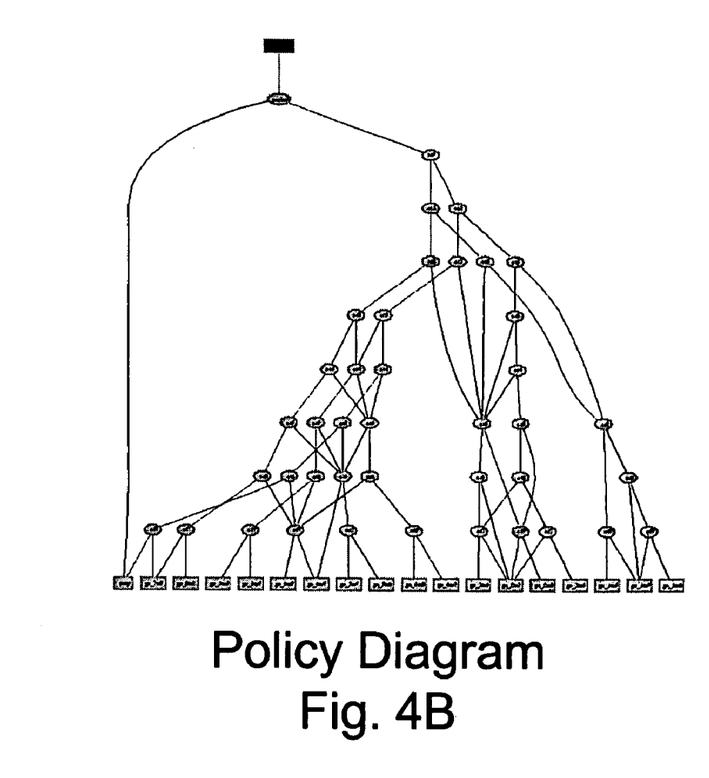
Figure 5A:
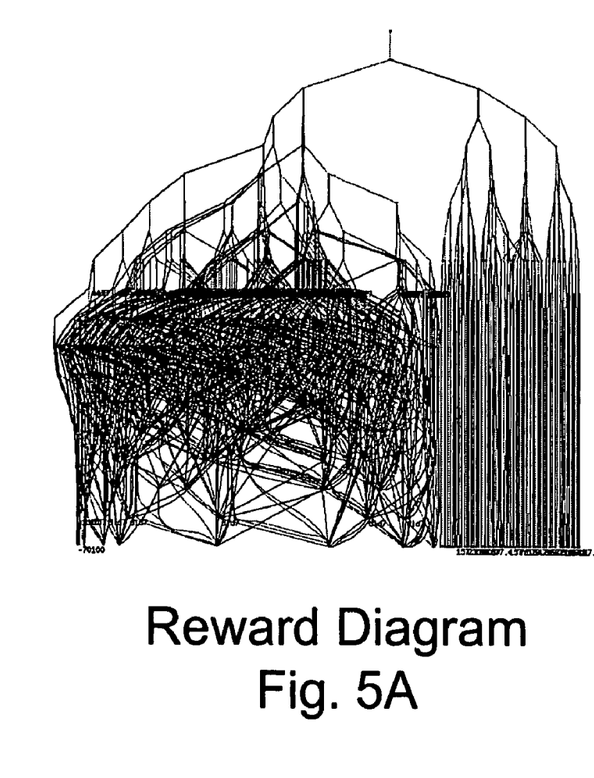
FIGS. 5A and 5B are an exemplary reward diagram and a policy diagram.
Figure 5B:
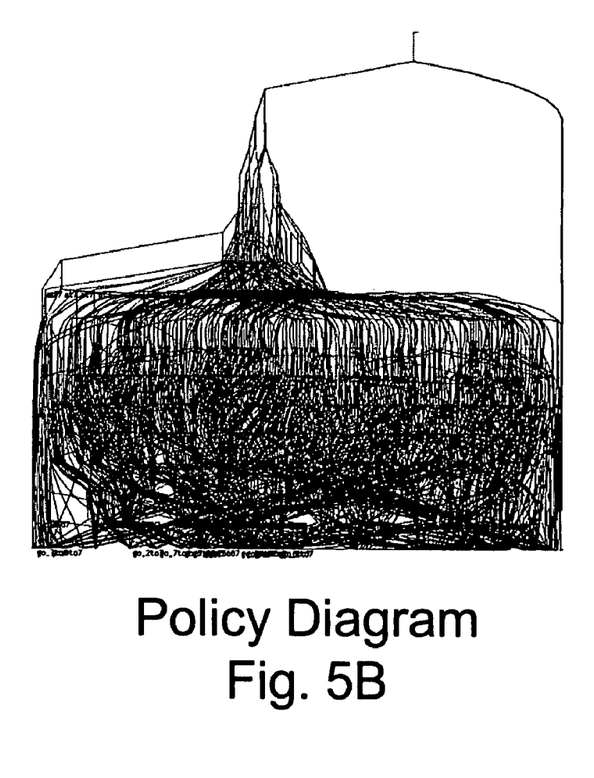

FIGS. 4A and 4B are a simplified reward diagram and a policy diagram. Reward diagrams, such as the simplified reward diagram shown in FIG. 4A illustrate the goal state indirectly, by showing a reward function. The policy diagram, or action diagram, illustrates the possible sequences of actions, and the state changes that result from them. It represents the effects of pre-action variables on post-action variables for a given action. FIGS. 5A and 5B are an exemplary reward diagram and a policy diagram, showing the complexity of the diagram.

Figure 6:
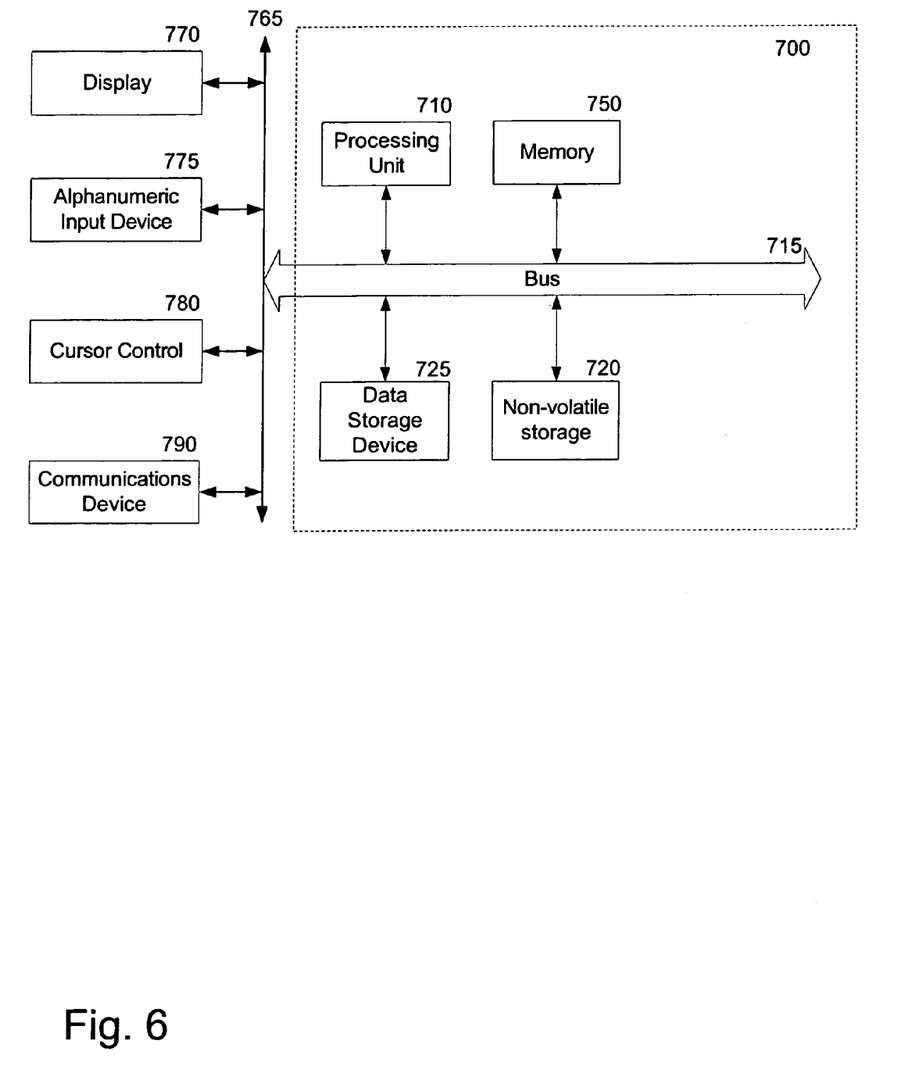
FIG. 6 is a block diagram of a computer system on which the present invention may be implemented.

FIG. 6 is one embodiment of a computer system that may be used with the present invention. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a cathode ray tube (CRT) or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, a wireless connection mechanism, or any other mechanism that provides connectivity between the computer system 600 and the outside world. Note that any or all of the components of this system illustrated in FIG. 6 and associated hardware may be used in various embodiments of the present invention.

It will be appreciated by those of ordinary skill in the art that any configuration of the system may be used for various purposes according to the particular implementation. The control logic or software implementing the present invention can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The present invention may also be embodied in a handheld or portable device containing a subset of the computer hardware components described above. For example, the handheld device may be configured to contain only the bus 615, the processor 610, and memory 650 and/or 625. The present invention may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 610. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of calculating a route to a resource, the method comprising:
   identifying a plurality of locations at which a first resource may be available, each of the plurality of locations having an associated non-zero probability of availability for the first resource;
   creating an optimal route through the plurality of locations to obtain the first resource, the route assuring that the first resource will be found regardless of availability at any one location, wherein creating the optimal route is based on a maximum expected value of each location calculated based on the probability of availability of the first resource at a location.

2. The method of claim 1, further comprising:
   identifying a cost associated with each location; and
   selecting a first location based on lowest cost, wherein the cost takes into account the probability of the resource being available at the first location.

3. The method of claim 2, wherein the cost comprises one or more of the following: distance, monetary costs, trade-offs.

4. The method of claim 1, further comprising:
   providing multi-step look-ahead to calculate the route from a first location to a second location, used if the resource is not available at the first location.

5. The method of claim 4, wherein the calculation of the multi-step look-ahead includes using user preferences for trade-offs for utilities.

6. The method of claim 1, further comprising:
   calculating probability of availability of the resource at each potential location; and
   selecting the first location based on lowest overall cost, wherein the lowest overall cost takes into account the probability of the resource being available, and additional costs, the additional costs including one or more of: distance, time requirements, price differential.

7. The method of claim 1, further comprising:
   providing multi-level reasoning permitting setting a preference along a continuum between optimization and speed.

8. The method of claim 7, wherein the multi-level reasoning provides speed when a valid plan is needed quickly, the method further comprising:
   improving optimization of the valid plan as time permits.

9. The method of claim 7, wherein the multi-level reasoning provides optimization to provide a least expensive route.

10. An apparatus to implement a route calculation engine comprising:
    a location fetching logic to identify a plurality of locations at which a resource may be available, each location having an associated probability of availability of the resource;
    a route calculation logic to create an optimal route through the plurality of locations, the route assuring that the resource will be found regardless of availability at any one location, the route calculation logic taking into account the probability of availability of the resource at each of the plurality of locations.

11. The apparatus of claim 10, further comprising:
    a goal receiving logic to receive a resource identification from a user, the resource identification identifying the sought resource.

12. The apparatus of claim 10, further comprising:
    a utility evaluation logic to identify a cost associated with each location.

13. The apparatus of claim 12, wherein the cost comprises one or more of the following: distance, monetary costs, trade-offs.

14. The apparatus of claim 10, further comprising:
    the route calculation logic further to provide multi-step look-ahead to calculate the route from a first location to a second location, used if the resource is not available at the first location.

15. The apparatus of claim 14, wherein the goal receiving logic is further to prompt a user to select preferences for trade-offs for utilities.

16. The apparatus of claim 10, further comprising:
    a probability calculation logic to calculate the probability of availability of the resource at each potential location, the probability calculation logic taking into account one or more of the following: availability, purchase cost, acquisition cost, and acquisition time of the resource, at each of the plurality of locations.

17. The apparatus of claim 10, further comprising:
    a preference setting logic to provide multi-level reasoning permitting setting a preference along a continuum between optimization and speed.

18. The apparatus of claim 17, wherein the preference setting logic enables the route calculation logic to provide speed when a valid plan is needed quickly, and to improve the optimization of the valid plan as time permits.

19. The apparatus of claim 17, wherein the preference setting logic enables the route calculation logic to provide optimization to provide a least expensive route if calculation time is not limited.

20. A machine readable medium having stored thereon data representing sequences of instructions, which when executed by a computer system, cause said computer system to calculate a route to a resource, by performing the acts of:
    identifying a plurality of locations at which the resource may be available, each of the plurality locations having an associated probability of availability of the resource;
    creating a route through the plurality of locations, the route assuring that the resource will be found regardless of availability at any one location, and ordering the locations in the route based on the probability of availability of the resource at each of the locations.

21. The machine readable medium of claim 20, having stored thereon additional data, which when executed by the computer system cause the computer system to further:
    identify a cost associated with each location, the cost comprising one or more of the following: distance, monetary costs, trade-offs.

22. The machine readable medium of claim 20, having stored thereon additional data, which when executed by the computer system cause the computer system to further:
    provide multi-step look-ahead to calculate the route from a first location to a second location, used if the resource is not available at the first location.

23. The machine readable medium of claim 20, further comprising calculating maximal expected value of each location, wherein the minimal expected cost is equal to the probability of availability of the resource at each potential location multiplied by an acquisition cost.

24. A system comprising:
    a server to receive the request from a user system, the server including a route calculation engine comprising:
    a location fetching logic to identify a plurality of locations at which the resource may be available, each of the plurality of locations having an associated probability of availability of the resource;

a utility evaluation logic to identify a cost of obtaining the resource at each location, the cost including a location cost and variable costs; and a route calculation logic to create an optimal route through the plurality of locations, the route assuring that the resource will be found regardless of availability at any one location.

25. The system of claim 24, further comprising:

a probability evaluation logic to calculate a probability that the resource is available at each of the plurality of locations, the probabilities being input to the route calculation logic.

26. The apparatus of claim 24, wherein the cost comprises one or more of the following: distance, monetary costs, trade-offs.

27. The apparatus of claim 24, further comprising:

the route calculation logic further to provide multi-step look-ahead to calculate the route from a first location to a second location, used if the resource is not available at the first location.

28. The apparatus of claim 24, further comprising:

a route sending logic to send a calculated route to the user system.

29. The apparatus of claim 28, further comprising:

the user system to receive the calculated route from the server for display to a user.

30. The apparatus of claim 29, further comprising:

a miss detection logic in the user system to detect if a primary path in the calculated route was not followed.

31. The apparatus of claim 30, further comprising:

an alternate route logic to retrieve an alternate path included within the calculated route, the alternate path designed to route the user back onto the primary path.

32. The apparatus of claim 29, further comprising:

a feedback logic to send relevant information back to the server.

33. A route calculation engine comprising:

a means to receive a resource request from a user;

a locating means to identify a plurality of locations at which a resource may be available, each of the plurality of location having an associated probability of availability of the resource;

a calculating means to calculate a cost of acquisition of the resource at each of the plurality of locations, the cost of acquisition including location cost and variable costs; and a means to create an optimal route through the plurality of locations, the route assuring that the resource will be found regardless of availability at any one location.

34. The apparatus of claim 33, further comprising:

a means to identify a cost associated with each location.

35. The apparatus of claim 34, wherein the cost comprises one or more of the following: distance, monetary costs, trade-offs.

36. The apparatus of claim 33, further comprising: a means to calculate the route from a first location to a second location, used if the resource is not available at the first location.

* * * * *